(12) United States Patent
Sun et al.

(10) Patent No.: US 9,490,528 B2
(45) Date of Patent: Nov. 8, 2016

(54) ELECTRONIC DEVICE AND METHOD OF MANUFACTURING A HOUSING FOR THE SAME

(71) Applicants: Beijing Lenovo Software Ltd., Beijing (CN); Lenovo (Beijing) Limited, Beijing (CN)

(72) Inventors: Min Sun, Beijing (CN); Xiaoqin Han, Beijing (CN); Lei Ma, Beijing (CN); Chenghao Zhang, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 48 days.

(21) Appl. No.: 14/580,969

(22) Filed: Dec. 23, 2014

(65) Prior Publication Data

US 2015/0349405 A1 Dec. 3, 2015

(30) Foreign Application Priority Data

May 30, 2014 (CN) .......................... 2014 1 0240220

(51) Int. Cl.
*H01Q 1/24* (2006.01)
*B29C 70/34* (2006.01)
(Continued)

(52) U.S. Cl.
CPC ............ *H01Q 1/243* (2013.01); *B29C 70/345* (2013.01); *B29C 70/882* (2013.01); *B29D 99/006* (2013.01); *H01Q 1/42* (2013.01); *B29K 2105/089* (2013.01); *B29K 2307/04* (2013.01); *B29L 2031/3481* (2013.01)

(58) Field of Classification Search
CPC ........ H01Q 1/243; H01Q 1/42; H01Q 1/422; B29C 70/345; B29K 2105/089
USPC .................................................. 343/702, 872
See application file for complete search history.

(56) References Cited

U.S. PATENT DOCUMENTS

| | | | | |
|---|---|---|---|---|
| 8,185,166 B2* | 5/2012 | Weber | ................... | H05K 5/0247 361/679.56 |
| 8,779,993 B2* | 7/2014 | Chiang | ................... | B32B 37/10 156/243 |
| 9,252,482 B2* | 2/2016 | Konanur | ................ | H01Q 1/243 343/702 |

(Continued)

*Primary Examiner* — Hoang V Nguyen
(74) *Attorney, Agent, or Firm* — Schwegman Lundberg & Woessner, P.A.

(57) ABSTRACT

Embodiments of the present application provide an electronic device and a method of manufacturing a housing for the electronic device, which belong to a field of electronic product. The electronic device comprises a housing and an antenna. The housing comprises N layers each of which is made of a first fiber material and a second fiber material; and the housing comprises a first region, and a second region made of the second fiber material. In the N layers, a first layer has a first fiber direction and comprises the first fiber material and the second fiber material, and a fiber direction of the first fiber material in the first layer is consistent with the first fiber direction, and a fiber direction of the second fiber material in the first layer is consistent with the first fiber direction, wherein a first splicing face where the first fiber material and the second fiber material in the first layer are spliced is parallel to the first fiber direction, and is hidden in the first layer so that when the first layer is formed as an outer surface of the housing, the housing is formed into one piece. The antenna is securely disposed in the housing and comprises a radiator in the second region, wherein a shielding influence value of the second fiber material on the radiator is less than a shielding influence value of the first fiber material on the radiator.

12 Claims, 8 Drawing Sheets

(51) Int. Cl.
*B29C 70/88* (2006.01)
*B29D 99/00* (2010.01)
*H01Q 1/42* (2006.01)
*B29K 307/04* (2006.01)
*B29L 31/34* (2006.01)
*B29K 105/08* (2006.01)

(56) References Cited

U.S. PATENT DOCUMENTS

2014/0375511 A1* 12/2014 Song ............... H01Q 1/2266 343/702
2015/0200442 A1* 7/2015 Aurongzeb ........ H01Q 1/2266 343/702

* cited by examiner

ELECTRONIC DEVICE AND METHOD OF MANUFACTURING A HOUSING FOR THE SAME

CROSS-REFERENCE TO RELATED APPLICATION

This application claims the benefit of Chinese Patent Application No. 201410240220.1 filed on May 30, 2014 in the State Intellectual Property Office of China, the whole disclosure of which is incorporated herein by reference.

BACKGROUND OF THE INVENTION

Field of the Invention

Embodiments of the present disclosure generally relate to a field of electronic product, and more particularly, to an electronic device and a method of manufacturing a housing for the same.

Description of the Related Art

Carbon fiber material is used as material for housings of 3C (Computer Communication Consumer Electronic) products due to its light and thin performances and its high quality and high technology. However, since carbon fiber material has a shielding effect to electromagnetic signals, it is not suitable for being applied in area of antenna in the housings of these products, such as mobile phones, tablet computers and notebook computers.

To solve this problem, the conventional solution is usually to manufacture only a portion of the housing by the carbon fiber material while forming the area of antenna by plastics. Final product housing is obtained by forming holes or grooves in the carbon fiber material portion and then adhering the carbon fiber material portion and the plastic portion together through appropriate processes.

However, the inventor of the present disclosure has found the following facts in related arts: since an interface between the plastic portion for area of antenna and the carbon fiber material portion is indelibile due to use of plastics in the manufacture of area of antenna, the housing cannot be formed into one piece in appearance, which brings great limitations in its industrial design. In order to smooth the interface as much as possible, lots of subsequent treatment processes, such as polishing, filling, spray painting, etc., are required, which leads to an increase in cost. Moreover, an additional step for adhering to the plastic portion should be included, which results in a lower yield rate and an increased cost.

SUMMARY OF THE INVENTION

According to one aspect of the present disclosure, there is provided an electronic device, comprising a housing, the housing comprising N layers each of which is made of a first fiber material and a second fiber material, where N is an integer and is greater than or equal to 2; the housing comprising a first region, and a second region made of the second fiber material; wherein, in the N layers, a first layer has a first fiber direction and comprises the first fiber material and the second fiber material, and a fiber direction of the first fiber material in the first layer is consistent with the first fiber direction, and a fiber direction of the second fiber material in the first layer is consistent with the first fiber direction, wherein a first splicing face where the first fiber material and the second fiber material in the first layer are spliced is hidden in the first layer to form the first layer, as an outer surface of the housing, and the housing into one piece; and an antenna securely disposed in the housing and comprising a radiator in the second region, wherein a shielding influence value of the second fiber material to the radiator is less than a shielding influence value of the first fiber material to the radiator.

According to another aspect of the present disclosure, there is provided a method of manufacturing a housing for an electronic device, the method comprising the steps of: laminating N layers of fiber material, each of which is made of a first fiber material and a second fiber material, where N is an integer and is greater than or equal to 2; wherein, in the N layers, a first layer has a first fiber direction and comprises the first fiber material and the second fiber material, and a fiber direction of the first fiber material in the first layer is consistent with the first fiber direction, and a fiber direction of the second fiber material in the first layer is consistent with the first fiber direction, wherein a first splicing face where the first fiber material and the second fiber material in the first layer are spliced is hidden in the first layer to form the first layer, as an outer surface of the housing, and the housing into one piece; and placing the laminated N layers of fiber material into a mold and thermo pressing and solidifying the laminated N layers of fiber material therein, so as to obtain the housing for the electronic device, the housing comprising a first region, and a second region made of the second fiber material, wherein a shielding influence value of the second fiber material to a radiator of an antenna is less than a shielding influence value of the first fiber material to the radiator.

BRIEF DESCRIPTION OF THE DRAWINGS

The above and other features of the present disclosure will become more apparent by describing in detail exemplary embodiments thereof with reference to the accompanying drawings, in which.

DETAILED DESCRIPTION OF EMBODIMENTS

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

First Embodiment

Figure 1:
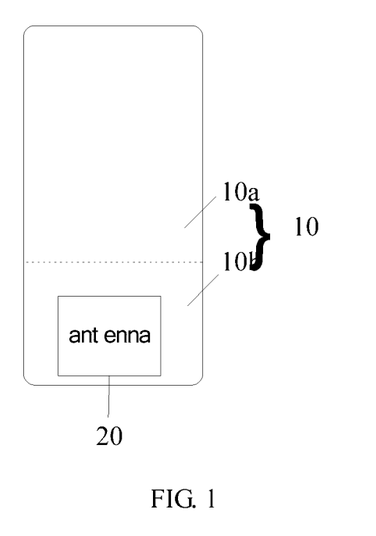
FIG. 1 is a schematic structural view of an electronic device according to a first embodiment of the present disclosure.
Figure 2:
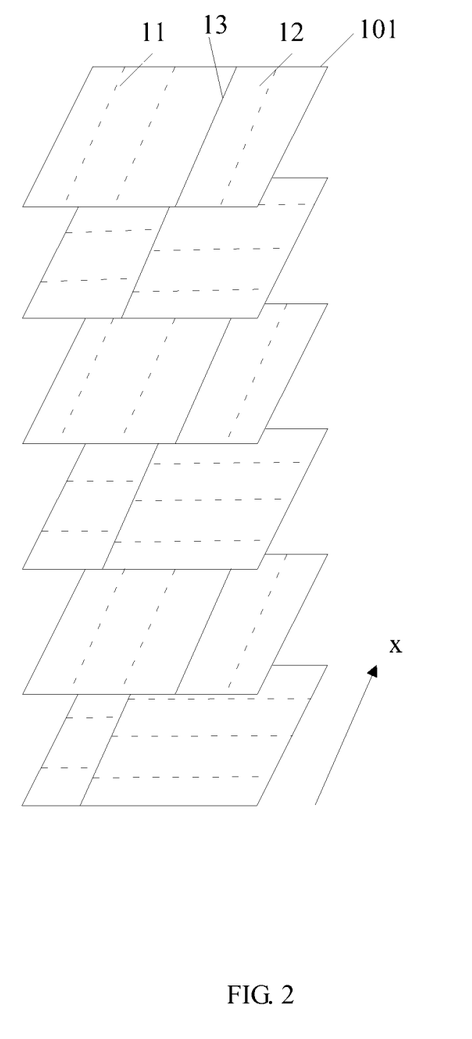
FIG. 2 is a schematic structural view of a housing according to the first embodiment of the present disclosure.

Referring to FIGS. 1-2, there is shown an electronic device according to a first embodiment of the present disclosure.

The electronic device comprises a housing 10 and an antenna 20. The housing 10 comprises N layers each of which is made of a first fiber material 11 and a second fiber material 12, where N is an integer and is greater than or equal to 2; wherein the housing 10 comprises a first region 10a, and a second region 10b made of the second fiber material 12; wherein, in the N layers, a first layer 101 has a first fiber direction (X direction shown in the FIGs) and comprises the first fiber material 11 and the second fiber material 12, and a fiber direction of the first fiber material 11 in the first layer 101 is consistent with the first fiber direction, and a fiber direction of the second fiber material 12 in the first layer 101 is consistent with the first fiber direction, wherein a first splicing face 13 where the first fiber material 11 and the second fiber material 12 in the first layer 101 are spliced is hidden in the first layer 101 so that when the first layer 101 is formed as an outer surface of the housing, the housing is formed into one piece. The antenna 20 is securely disposed in the housing 10 and comprises a radiator disposed in the second region 10b, wherein a shielding influence value of the second fiber material 12 on the radiator of the antenna 20 is less than a shielding influence value of the first fiber material 11 on the radiator.

In the present embodiment, an angle between the first splicing face 13 and the first fiber material can be any angle, such as zero degree, 45 degrees, or 90 degrees.

In the present embodiment, the electronic device comprises the housing and the antenna. The housing comprises N layers each of which is made of a first fiber material and a second fiber material. In the N layers, a first layer has a first fiber direction and comprises the first fiber material and the second fiber material, and a fiber direction of the first fiber material in the first layer is consistent with the first fiber direction, and a fiber direction of the second fiber material in the first layer is consistent with the first fiber direction, wherein a first splicing face where the first fiber material and the second fiber material in the first layer are spliced is parallel to the first fiber direction, is hidden in the first layer so that when the first layer is formed as an outer surface of the housing, the housing is formed into one piece. As a result, no interface is formed on the housing of the electronic device such that the housing is formed into one piece in appearance and no subsequent treatment process is required, which leads to a decrement in cost. Moreover, the antenna is securely disposed in the housing, the housing comprises a first region made of the first fiber material and a second region made of the second fiber material, and the antenna comprises a radiator in the second region, and a shielding influence value of the second fiber material on the radiator is less than a shielding influence value of the first fiber material on the radiator. As a result, such housing has no shielding effect on antenna signals.

Second Embodiment

Referring to FIGS. 1 and 3-6, there is shown an electronic device according to a second embodiment of the present disclosure.

The electronic device comprises a housing 10, and an antenna 20. The housing 10 comprises N layers each of which is made of a first fiber material 11 and a second fiber material 12, where N is an integer and is greater than or equal to 2; wherein the housing 10 comprises a first region 10a, and a second region 10b made of the second fiber material 12; wherein, in the N layers, a first layer 101 has a first fiber direction (X direction shown in the FIGs) and comprises the first fiber material 11 and the second fiber material 12, and a fiber direction of the first fiber material 11 in the first layer 101 is consistent with the first fiber direction, and a fiber direction of the second fiber material 12 in the first layer 101 is consistent with the first fiber direction, wherein a first splicing face 13 where the first fiber material 11 and the second fiber material 12 in the first layer 101 are spliced is parallel to the first fiber direction, and the first splicing face 13 is hidden in the first layer 101 so that when the first layer 101 is formed as an outer surface of the housing, the housing is formed into one piece. The antenna 20 is securely disposed in the housing 10 and comprises a radiator disposed in the second region 10b, wherein a shielding influence value of the second fiber material 12 on the radiator of the antenna 20 is less than a shielding influence value of the first fiber material 11 on the radiator.

Figure 3:
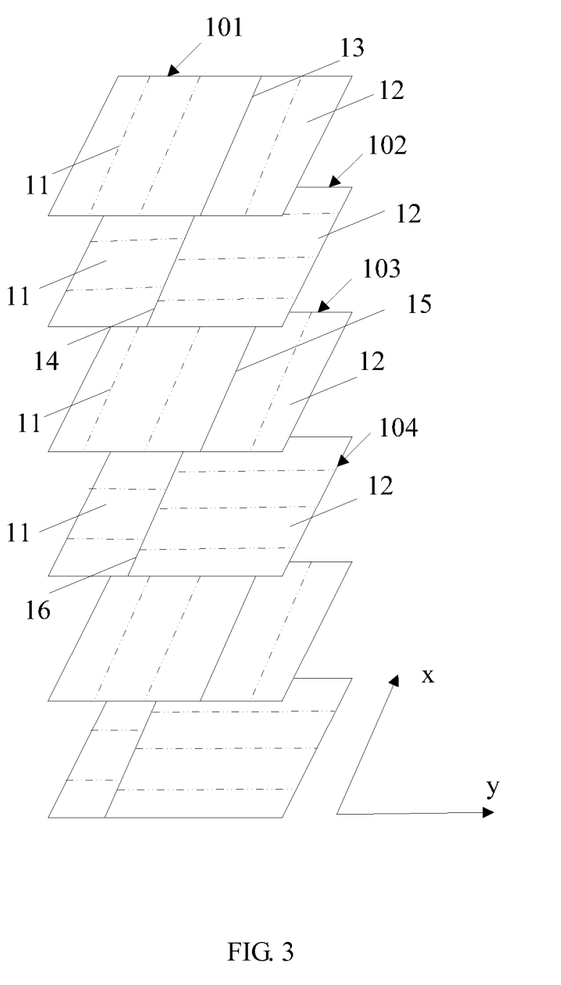
FIG. 3 is a schematic structural view of a housing according to a second embodiment of the present disclosure.
Figure 4:
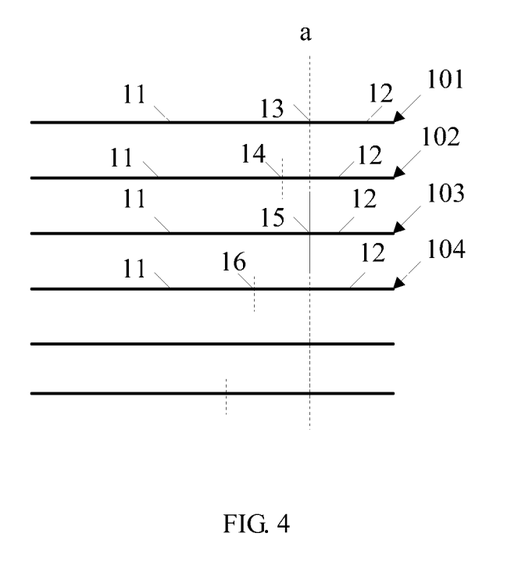
FIG. 4 is a schematic structural side view of the housing according to the second embodiment of the present disclosure.
Figure 5:
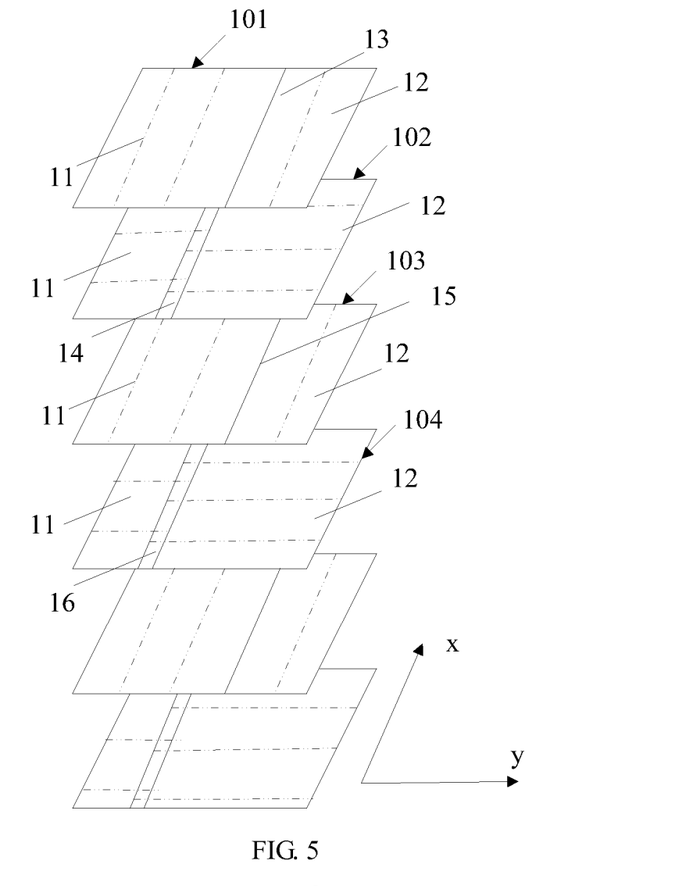
FIG. 5 is another schematic structural view of the housing according to the second embodiment of the present disclosure.
Figure 6:
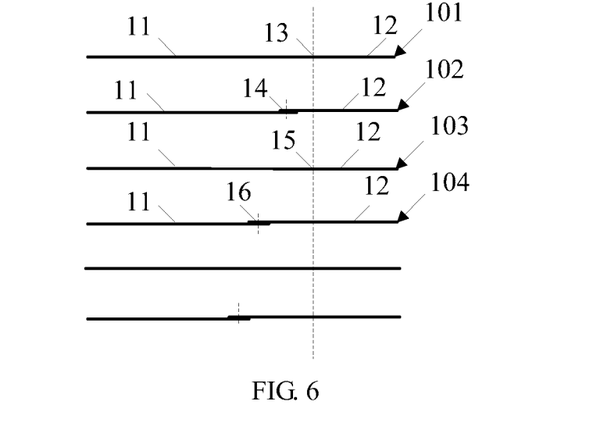
FIG. 6 is another schematic structural side view of the housing according to the second embodiment of the present disclosure.
Figure 7:
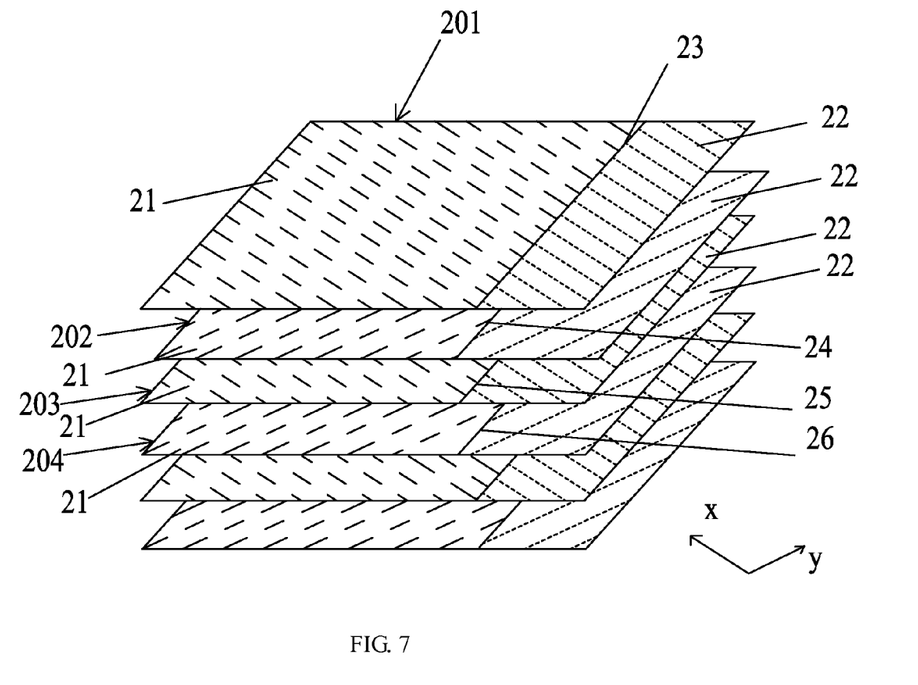
FIG. 7 is a schematic structural view of a housing according to a third embodiment of the present disclosure.

In one implementation of the present embodiment, connection between the first fiber material 11 and the second fiber material 12 in the first layer 101 may be achieved by a butting joint, as shown in FIGS. 3 and 4. In another implementation of the present embodiment, connection between the first fiber material 11 and the second fiber material 12 in the first layer 101 may be achieved by a lapping joint if a direction of the splicing face in this layer is not consistent with the fiber direction, while, such connection may be achieved by a butting joint if the direction of the splicing face in this layer is consistent with the fiber direction, as shown in FIGS. 5 and 6. This connection by a lapping joint would be considered only if the direction of the splicing face in this layer is not consistent with the fiber direction, while this connection by a butting joint would be used once the direction of the splicing face in this layer is parallel to the fiber direction. This is because the connection by a butting joint achieves a smoother interface than the connection by a lapping joint. In case that the direction of the splicing face is not consistent with the fiber direction, this connection by a lapping joint is used in order to improve strength for the connection. In case that the direction of the splicing face is parallel to the fiber direction, both the connection by a lapping joint and the connection by a butting joint achieve the same strength for the connection.

According to the present embodiment, in the N layers, a second layer 102 has a second fiber direction (Y direction shown in the FIGs) and comprises the first fiber material 11 and the second fiber material 12, and a fiber direction of the first fiber material 11 in the second layer is consistent with the second fiber direction, and a fiber direction of the second fiber material 12 in the second layer 102 is consistent with the second fiber direction; wherein a second splicing face 14 where the first fiber material 11 and the second fiber material 12 are spliced is perpendicular to the second fiber direction perpendicular to the first fiber direction.

According to the present embodiment, in the N layers, a third layer 103 has the first fiber direction and comprises the first fiber material 11 and the second fiber material 12, and a fiber direction of the first fiber material 11 in the third layer 103 is consistent with the first fiber direction, and a fiber direction of the second fiber material 12 in the third layer 103 is consistent with the first fiber direction; wherein a third splicing face 15 where the first fiber material 11 and the second fiber material 12 in the third layer 103 are spliced is parallel to the first fiber direction; wherein the first splicing face 13 belongs to a first part of a dividing face a, the dividing face being where the first region and the second region of the housing are divided, and the third splicing face 15 belongs to a second part of the dividing face a.

That is, the first splicing face 13 and the third splicing face 15 are in the same plane. Since both the first fiber material 11 and the second fiber material 12 in each layer are previously cut out and laminated according to sizes while the first splicing face 13 in the first layer and the third splicing face 15 in the third layer are in the same plane, the first fiber materials 11 in both of the first layer 13 and the third splicing face 15 possess the same size while the second fiber material 12 in both of the first layer 13 and the third splicing face 15 also possess the same size. This facilitates the cutting-out process.

Moreover, the same design may be applied in the fifth layer, that is, a fifth splicing face in the fifth layer also belongs to a first part of the dividing face. That is, according to the present embodiment, the same design may be applied in two alternatively arranged layers, in each of which both the first fiber material 11 and the second fiber material 12 have their directions parallel to the fiber direction in the layer, such as the first fiber direction. As a result, a simpler manufacturing process is achieved.

According to the present embodiment, in the N layers, a fourth layer 104 has the second fiber direction and comprises the first fiber material 11 and the second fiber material 12, and a fiber direction of the first fiber material 11 in the fourth layer 104 is consistent with the second fiber direction in the fourth layer 104, and a fiber direction of the second fiber material 12 is consistent with the second fiber direction; wherein a fourth splicing face 16 where the first fiber material 11 and the second fiber material 12 are spliced is perpendicular to the second fiber direction, and a first distance from the second splicing face 14 to the dividing face is different from a second distance from the fourth splicing face 16 to the dividing face.

Since the first distance is different from the second distance, the situation in which both the splicing face in the second layer and the splicing face in the fourth layer are in the same plane is avoid, which smoothes the interface formed in the housing and thus ensures obtaining a much more stable housing.

In the present embodiment, the second splicing face 14 and the fourth splicing face 16 are located at the same side of the dividing face. In other embodiments, the second splicing face 14 and the fourth splicing face 16 can be located at either sides of the dividing face, respectively.

In particular, as shown in FIGS. 4 and 6, both the first splicing face 13 in the first layer 101 and the third splicing face 15 in the third layer 103 are overlapped with the dividing face a where the first region 10a and the second region 10b of the housing are divided. As mentioned above, both the first splicing face 13 in the first layer 101 and the third splicing face 15 in the third layer 103 are parts of the dividing face a, such that portions of the first region 10a of the housing in both the first layer 101 and the third layer 103 are made of the first fiber material 11. Besides, the second splicing face 14 and the fourth splicing face 16 are located at the same side of the dividing face a. As shown, both the second splicing face 14 and the fourth splicing face 16 are located within the first region 10a, such that portions of the first region 10a of the housing in both the second layer 102 and the fourth layer 104 are made of the first fiber material 11 and the second fiber material 12 together.

The fiber material itself has a fiber direction, and as mentioned above, in the first layer, the fiber direction of the first fiber material 11 and that of the second fiber material 12 are the same as the first fiber direction. In the present embodiment, the first fiber direction has a zero degree relative to a length direction or a width direction of the electronic device. That is, in the first layer, the fiber direction of the first fiber material 11 and that of the second fiber material 12 forms an angle of zero degree relative to the length direction or the width direction of the electronic device, here, the electronic device may be a mobile phone, tablet computer, etc. In this case, the second fiber direction forms an angle of 90 degrees relative to the length direction or the width direction of the electronic device.

According to the present embodiment, the directions of the splicing faces form an angle of 90 degrees or zero degree relative to the fiber direction of the fiber material itself. Accordingly, it is convenient to cut out and laminate the fiber materials and thus its manufacturing efficiency is improved. Moreover, it is easy to perform the manual operation since prepregs are not easy to wrinkle and tear. Besides, it has a high utilization rate of raw material.

According to the present embodiment, the first fiber material 11 comprises carbon fiber prepreg, aramid fiber prepreg, basalt fiber prepreg or glass fiber prepreg, while the second fiber material 12 comprises non-conductive fiber prepregs, such as aramid fiber prepreg, basalt fiber prepreg or glass fiber prepreg. All the carbon fiber prepreg, aramid fiber prepreg, basalt fiber prepreg and glass fiber prepreg are those having light quality and high strength, and the carbon fiber prepreg, aramid fiber prepreg, basalt fiber prepreg and glass fiber prepreg have no effect on antenna signals.

In the present embodiment, the electronic device comprises the housing and the antenna. The housing comprises N layers each of which is made of a first fiber material and a second fiber material. In the N layers, a first layer has a first fiber direction and comprises the first fiber material and the second fiber material, and a fiber direction of the first fiber material in the first layer is consistent with the first fiber direction, and a fiber direction of the second fiber material in the first layer is consistent with the first fiber direction, wherein a first splicing face where the first fiber material and the second fiber material in the first layer are spliced is parallel to the first fiber direction, and the first splicing face is hidden in the first layer so that when the first layer is formed as an outer surface of the housing, the housing is formed into one piece. As a result, no interface is formed on the housing of the electronic device such that the housing is formed into one piece in appearance and no subsequent treatment process is required, which leads a decrement in cost. Moreover, the antenna is securely disposed in the housing, the housing comprises a first region made of the first fiber material and a second region made of the second fiber material, and the antenna comprises a radiator in the second region, and a shielding influence value of the second fiber material on the radiator is less than a shielding influence value of the first fiber material on the radiator. As a result, such housing has no shielding effect on antenna signals.

Third Embodiment

Referring to FIGS. 1 and 7-10, there is shown an electronic device according to a third embodiment of the present disclosure.

The electronic device comprises: a housing 10 and an antenna 20. The housing 10 comprises N layers each of which is made of a first fiber material 21 and a second fiber material 22, where N is an integer and is greater than or equal to 2; wherein the housing 10 comprises a first region 10a, and a second region 10b made of the second fiber material 12; wherein, in the N layers, a first layer 201 has a first fiber direction (X direction shown in the FIGs) and comprises the first fiber material 21 and the second fiber material 22, and a fiber direction of the first fiber material 21 in the first layer 201 is consistent with the first fiber direction, and a fiber direction of the second fiber material 22 in the first layer 201 is consistent with the first fiber direction, wherein an angle between a first splicing face 23, where the first fiber material 21 in the first layer 201 and the second fiber material 22 in the first layer 201 are spliced, and the first fiber direction is 45 degrees, and, the first splicing face 23 is hidden in the first layer 201 so that when the first layer 201 is formed as an outer surface of the housing, the housing is formed into one piece. The antenna 20 is securely disposed in the housing 10 and comprises a radiator disposed in the second region 10b, wherein a shielding influence value of the second fiber material 22 on the radiator of the antenna 20 is less than a shielding influence value of the first fiber material 21 on the radiator.

In one implementation of the present embodiment, connection between the first fiber material 21 and the second fiber material 22 in each layer may be achieved by a butting joint, as shown in FIGS. 3 and 4. In another implementation of the present embodiment, this connection may be achieved by a lapping joint, as shown in FIGS. 5 and 6.

According to the present embodiment, in the N layers, a second layer 202 has a second fiber direction (Y direction shown in the FIGs) and comprises the first fiber material 21 and the second fiber material 22, and a fiber direction of the first fiber material 21 in the second layer 202 is consistent with the second fiber direction, and a fiber direction of the second fiber material 22 in the second layer 202 is consistent with the second fiber direction; wherein a second splicing face 24 where the first fiber material 21 and the second fiber material 22 are spliced forms an angle of 45 degrees relative to the second fiber direction perpendicular to the first fiber direction.

According to the present embodiment, in the N layers, a third layer 203 has the first fiber direction and comprises the first fiber material 21 and the second fiber material 22, and a fiber direction of the first fiber material 21 in the third layer 203 is consistent with the first fiber direction, and a fiber direction of the second fiber material 22 in the third layer 203 is consistent with the first fiber direction; wherein a third splicing face 25 where the first fiber material 21 and the second fiber material 22 in the third layer 203 are spliced forms an angle of 45 degrees relative to the first fiber direction.

According to the present embodiment, in the N layers, a fourth layer 204 has the second fiber direction and comprises the first fiber material 21 and the second fiber material 22, and a fiber direction of the first fiber material 21 in the fourth layer 204 is consistent with the second fiber direction in the fourth layer 204, and a fiber direction of the second fiber material 22 is consistent with the second fiber direction; wherein a fourth splicing face 26 where the first fiber material 21 and the second fiber material 22 are spliced forms an angle of 45 degrees relative to the second fiber direction.

Respective Distances from the abovementioned second splicing face 24, third splicing face 25 and fourth splicing face 26 to the first splicing face 23 are different from one another.

Due to these different distances, the situation in which all the splicing faces in respective layers are in the same plane is avoid, which smoothes the interface formed in the housing and thus ensures obtaining a much more stable housing.

Figure 8:
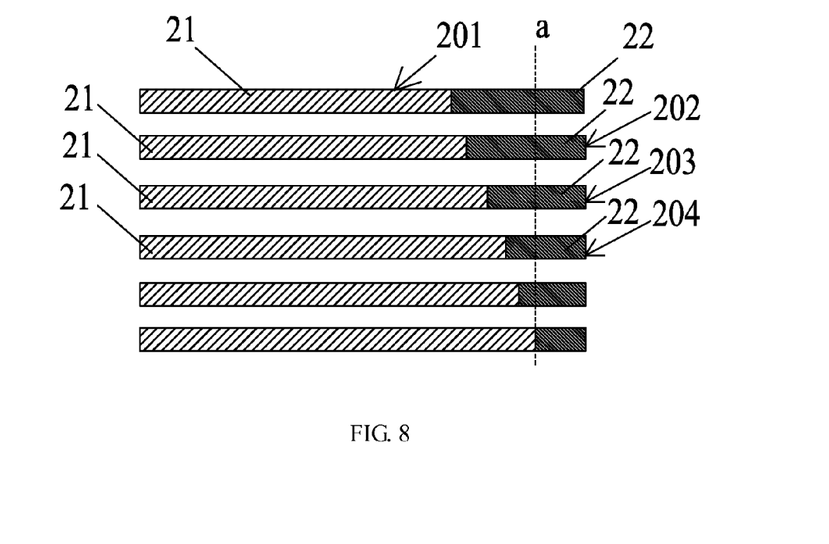
FIG. 8 is a schematic structural side view of the housing according to the third embodiment of the present disclosure.
Figures 9, 10:
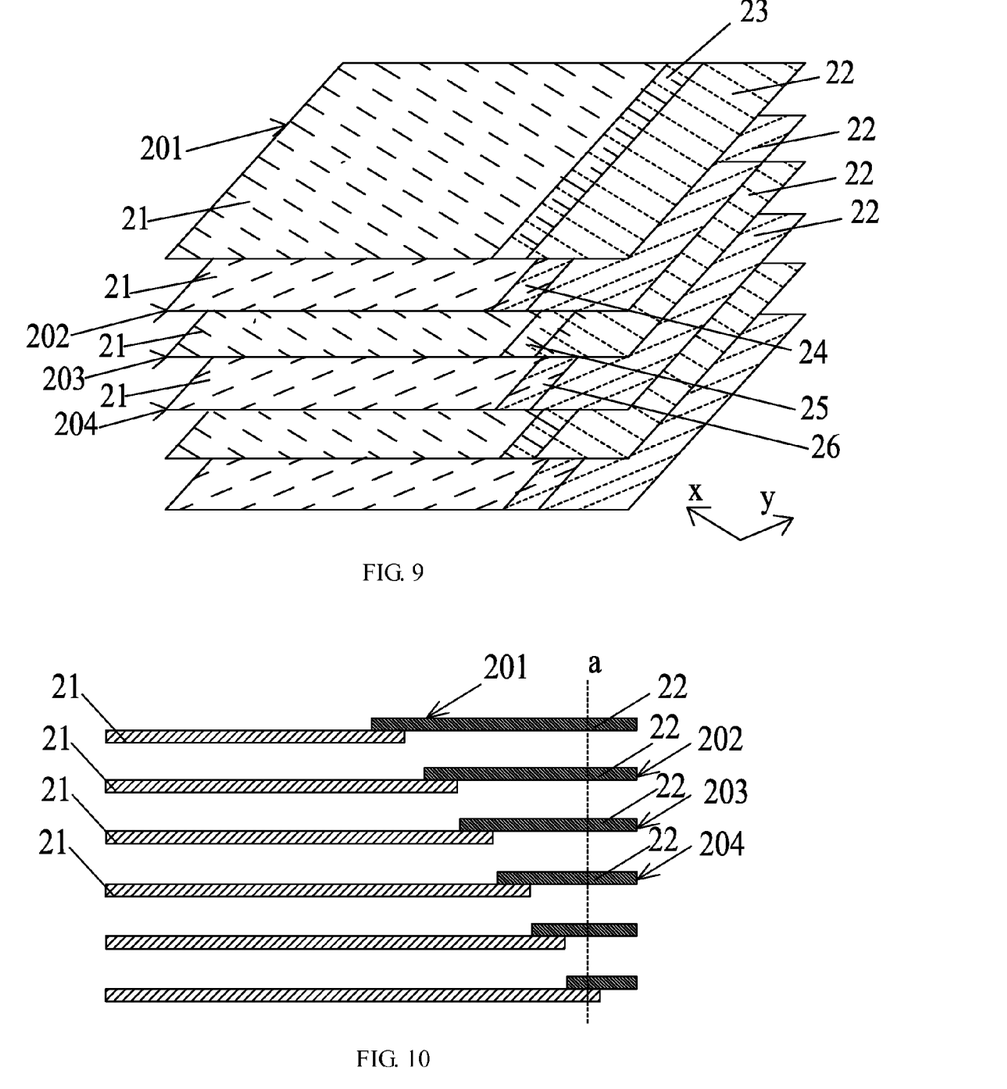
FIG. 9 is another schematic structural view of the housing according to the third embodiment of the present disclosure.
FIG. 10 is the schematic structural side view of the housing according to the third embodiment of the present disclosure.

In detail, as shown in FIGS. 8 and 10, a dividing face where the first region 10a and the second region 10b are divided is labeled as a. That is, both sides of the dividing face a are the first region 10a and the second region 10b, respectively, and the second region 10b is made of the second fiber material 12. According to the present embodiment, as shown in FIGs, the first region 10a may be made of the first fiber material 11 and the second fiber material 12 together, or be made of only the first fiber material 11.

The fiber material itself has a fiber direction, and as mentioned above, in the first layer, the fiber direction of the first fiber material 11 and that of the second fiber material 12 are the same as the first fiber direction. In the present embodiment, the first fiber direction forms an angle of 45 degrees relative to a length direction or a width direction of the electronic device. That is, in the first layer, the fiber direction of the first fiber material 11 and that of the second fiber material 12 forms an angle of 45 degrees relative to the length direction or the width direction of the electronic device, here, the electronic device may be a mobile phone, tablet computer, etc. In this case, the second fiber direction forms an angle of 45 degrees relative to the length direction or the width direction of the electronic device.

According to the present embodiment, the first fiber material 21 comprises carbon fiber prepreg, aramid fiber prepreg, basalt fiber prepreg or glass fiber prepreg, while the second fiber material 22 comprises non-conductive fiber prepregs, such as aramid fiber prepreg, basalt fiber prepreg or glass fiber prepreg. All the carbon fiber prepreg, aramid fiber prepreg, basalt fiber prepreg and glass fiber prepreg are those having light quality and high strength, and the carbon fiber prepreg, aramid fiber prepreg, basalt fiber prepreg and glass fiber prepreg have no effect on antenna signals.

In the present embodiment, the electronic device comprises the housing and the antenna. The housing comprises N layers each of which is made of a first fiber material and a second fiber material. In the N layers, a first layer has a first fiber direction and comprises the first fiber material and the second fiber material, and a fiber direction of the first fiber material in the first layer is consistent with the first fiber direction, and a fiber direction of the second fiber material in the first layer is consistent with the first fiber direction, wherein a first splicing face where the first fiber material and the second fiber material in the first layer are spliced is parallel to the first fiber direction, and the first splicing face is hidden in the first layer so that when the first layer is formed as an outer surface of the housing, the housing is formed into one piece. As a result, no interface is formed on the housing of the electronic device such that the housing is formed into one piece in appearance and no subsequent treatment process is required, which leads to a decrement in cost. Moreover, the antenna is securely disposed in the housing, the housing comprises a first region made of the first fiber material and a second region made of the second fiber material, and the antenna comprises a radiator in the second region, and a shielding influence value of the second fiber material on the radiator is less than a shielding influence value of the first fiber material on the radiator. As a result, such housing has no shielding effect on antenna signals.

Fourth Embodiment

Figure 11:
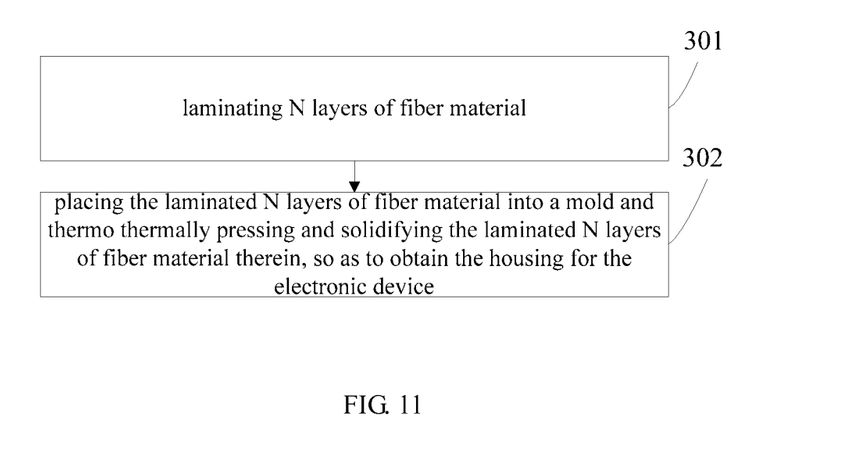
FIG. 11 is a flow chart of a method of manufacturing a housing for an electronic device according to a fourth embodiment of the present disclosure.

Referring to FIG. 11, there is shown a method of manufacturing a housing for an electronic device according to a fourth embodiment of the present disclosure.

The method comprises: a step 301 of laminating N layers of fiber material, each of which is made of a first fiber material and a second fiber material, where N is an integer and is greater than or equal to 2; wherein, in the N layers, a first layer has a first fiber direction and comprises the first fiber material and the second fiber material, and a fiber direction of the first fiber material in the first layer is consistent with the first fiber direction, and a fiber direction of the second fiber material in the first layer is consistent with the first fiber direction, wherein a first splicing face where the first fiber material and the second fiber material in the first layer are spliced is parallel to the first fiber direction, and is hidden in the first layer so that when the first layer is formed as an outer surface of the housing, the housing is formed into one piece; and, a step 302 of placing the laminated N layers of fiber material into a mold and thermally pressing and solidifying the laminated N layers of fiber material therein, so as to obtain the housing for the electronic device, the housing comprising a first region, and a second region made of the second fiber material, wherein a shielding influence value of the second fiber material on a radiator of an antenna is less than a shielding influence value of the first fiber material on the radiator.

According to the present disclosure, an angle between the first splicing face and the first fiber direction can be any angle, such as zero degree, 45 degrees, or 90 degrees.

In the present embodiment, the electronic device comprises a housing and an antenna. The housing comprises N layers each of which is made of a first fiber material and a second fiber material. In the N layers, a first layer has a first fiber direction and comprises the first fiber material and the second fiber material, and a fiber direction of the first fiber material in the first layer is consistent with the first fiber direction, and a fiber direction of the second fiber material in the first layer is consistent with the first fiber direction, wherein a first splicing face where the first fiber material and the second fiber material in the first layer are spliced is parallel to the first fiber direction, and the first splicing face is parallel to the first fiber direction, and is hidden in the first layer so that when the first layer is formed as an outer surface of the housing, the housing is formed into one piece. As a result, no interface is formed on the housing of the electronic device such that the housing is formed into one piece in appearance and no subsequent treatment process is required, which leads to a decrement in cost. Moreover, the antenna is securely disposed in the housing, the housing comprises a first region made of the first fiber material and a second region made of the second fiber material, and the antenna comprises a radiator in the second region, and a shielding influence value of the second fiber material on the radiator is less than a shielding influence value of the first fiber material on the radiator. As a result, such housing has no shielding effect on antenna signals.

Fifth Embodiment

Figure 12:
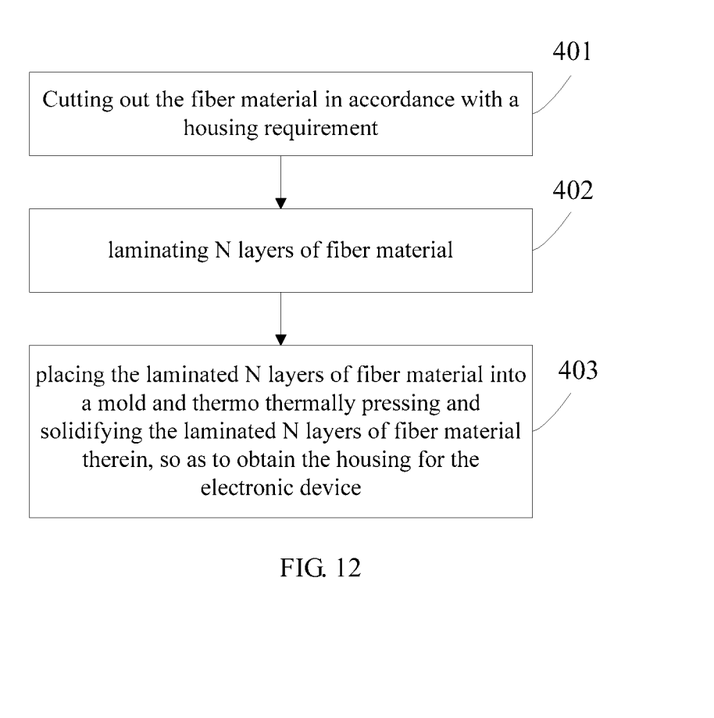
FIG. 12 is a flow chart of a method of manufacturing a housing for an electronic device according to a fifth embodiment of the present disclosure.

Referring to FIG. 12, there is shown a method of manufacturing a housing for an electronic device according to a fifth embodiment of the present disclosure.

The method comprises a step 401 of cutting out the fiber materials in accordance with a requirement for the housing.

Here, the requirement for the housing mainly includes a size requirement. The cutting-out is performed in accordance with area of the fiber material in each layer.

The method further comprises a step 402 of laminating N layers of fiber material, each of which is made of a first fiber material and a second fiber material, where N is an integer and is greater than or equal to 2; wherein, in the N layers, a first layer has a first fiber direction and comprises the first fiber material and the second fiber material, and a fiber direction of the first fiber material in the first layer is consistent with the first fiber direction, and a fiber direction of the second fiber material in the first layer is consistent with the first fiber direction, wherein a first splicing face where the first fiber material and the second fiber material in the first layer are spliced is parallel to the first fiber direction, and is hidden in the first layer so that when the first layer is formed as an outer surface of the housing, the housing is formed into one piece.

In the present disclosure, the step 402 may comprise laminating a second layer onto the first layer, wherein the second layer has a second fiber direction and comprises the first fiber material and the second fiber material, and a fiber direction of the first fiber material in the second layer is consistent with the second fiber direction, and a fiber direction of the second fiber material in the second layer is consistent with the second fiber direction; wherein a second splicing face where the first fiber material and the second fiber material are spliced is perpendicular to the second fiber direction perpendicular to the first fiber direction.

In the present disclosure, the step 402 may further comprise laminating a third layer onto the second layer, wherein the third layer has the first fiber direction and comprises the first fiber material and the second fiber material, and a fiber direction of the first fiber material in the third layer is consistent with the first fiber direction, and a fiber direction of the second fiber material in the third layer is consistent with the first fiber direction; wherein a third splicing face where the first fiber material and the second fiber material in the third layer are spliced is parallel to the first fiber direction; wherein the first splicing face belongs to a first part of a dividing face, the dividing face being where the first region and the second region of the housing are divided, and the third splicing face belongs to a second part of the dividing face.

That is, the first splicing face and the third splicing face are in the same plane. Since both the first fiber material and the second fiber material are previously cut out and laminated according to sizes while the first splicing face in the first layer and the third splicing face in the third layer are in the same plane, the first fiber materials in both the first layer and the third layer possess the same size while the second fiber material in both the first layer and the third layer also possess the same size. This facilitates the cutting-out process.

Moreover, the same design may be applied in the fifth layer. A fifth splicing face of the fifth layer also belongs to a part of the dividing face. That is, according to the present embodiment, the same design may be applied in two alternatively arranged layers, in each of which both the first fiber material 11 and the second fiber material 12 have their directions parallel to the fiber direction in the layer, such as the first fiber direction. As a result, a simpler manufacture process is achieved.

In the present disclosure, the step 402 may further comprise laminating a fourth layer onto the third layer, wherein the fourth layer has the second fiber direction and comprises the first fiber material and the second fiber material, and a fiber direction of the first fiber material in the fourth layer is consistent with the second fiber direction in the fourth layer, and a fiber direction of the second fiber material is consistent with the second fiber direction; wherein a fourth splicing face where the first fiber material and the second fiber material are spliced is perpendicular to the second fiber direction, and a first distance from the second splicing face to the dividing face is different from a second distance from the fourth splicing face to the dividing face.

Since the first distance is different from the second distance, the situation in which both the splicing face in the second layer and the splicing face in the fourth layer are in the same plane is avoid, which smoothes the interface formed in the housing and thus ensures obtaining a much more stable housing.

In particular, both the first splicing face in the first layer and the third splicing face in the third layer are overlapped with the dividing face a where the first region and the second region of the housing are divided. As mentioned above, both the first splicing face in the first layer and the third splicing face in the third layer are parts of the dividing face, such that portions of the first region of the housing in both the first layer and the third layer are made of the first fiber material. Besides, the second splicing face and the fourth splicing face are located at the same side of the dividing face. As shown, both the second splicing face and the fourth splicing face are located within the first region such that portions of the first region of the housing in both the second layer and the fourth layer are made of the first fiber material and the second fiber material together.

Moreover, during the laminating process, either a connection by a lapping joint or a connection by a butting joint is used for the connection between the first fiber material and the second fiber material in each layer.

In other embodiments, the laminating process in the step 402 is the same as that in the present embodiment, but configurations of these layers are the same as those in the third embodiment and will not be described here.

The method also comprises a step 403 of placing the laminated N layers of fiber material into a mold and thermally pressing and solidifying the laminated N layers of fiber material therein, so as to obtain the housing for the electronic device, the housing comprising a first region, and a second region made of the second fiber material, wherein a shielding influence value of the second fiber material on a radiator of an antenna is less than a shielding influence value of the first fiber material on the radiator.

Specifically, the thermally pressing and solidifying refers to performing a solidification process on the laminated N layers of fiber material within the mold, under a predetermined temperature and pressure. Since the fiber material is applied onto both the two regions in each layer, the splicing face in each layer is hidden in the corresponding layer, so that the housing is formed into one piece.

According to the present embodiment, the second splicing face and the fourth splicing face are located at the same side of the dividing face. According to other embodiments, the second splicing face and the fourth splicing face are located at either sides of the dividing face, respectively.

The fiber material itself has a fiber direction, and as mentioned the above, in the first layer, the fiber direction of the first fiber material and that of the second fiber material are the same as the first fiber direction. In the present embodiment, the first fiber direction forms an angle of zero degree relative to a length direction or a width direction of the electronic device. That is, in the first layer, the fiber direction of the first fiber material and that of the second fiber material form an angle of zero degree relative to the length direction or the width direction of the electronic device, here, the electronic device may be a mobile phone, tablet computer, etc. In this case, the second fiber direction forms an angle of 90 degrees relative to the length direction or the width direction of the electronic device.

According to the present embodiment, the first fiber material comprises carbon fiber prepreg, aramid fiber prepreg, basalt fiber prepreg or glass fiber prepreg, while the second fiber material 12 comprises non-conductive fiber prepregs, such as aramid fiber prepreg, basalt fiber prepreg or glass fiber prepreg. All the carbon fiber prepreg, aramid fiber prepreg, basalt fiber prepreg and glass fiber prepreg are those having light quality and high strength, and the carbon fiber prepreg, aramid fiber prepreg, basalt fiber prepreg and glass fiber prepreg have no effect on antenna signals.

Furthermore, after the above step 403, the method may further comprise a step of detaching the solidified housing from the mold, then trimming and finishing the housing, and cleaning the surface of the housing.

In the present embodiment, the electronic device comprises the housing and the antenna. The housing comprises N layers each of which is made of a first fiber material and a second fiber material. In the N layers, a first layer has a first fiber direction and comprises the first fiber material and the second fiber material, and a fiber direction of the first fiber material in the first layer is consistent with the first fiber direction, and a fiber direction of the second fiber material in the first layer is consistent with the first fiber direction, wherein a first splicing face where the first fiber material and the second fiber material in the first layer are spliced is parallel to the first fiber direction such that the first splicing face is hidden in the first layer so that when the first layer is formed as an outer surface of the housing, the housing is formed into one piece. As a result, no interface is formed on the housing of the electronic device such that the housing is formed into one piece in appearance and no subsequent treatment process is required, which leads a decrement in cost. Moreover, the antenna is securely disposed in the housing, the housing comprises a first region made of the first fiber material and a second region made of the second fiber material, and the antenna comprises a radiator in the second region, wherein a shielding influence value of the second fiber material on the radiator is less than a shielding influence value of the first fiber material on the radiator. As a result, such housing has no shielding effect on antenna signals.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. An electronic device, comprising:
a housing, the housing comprising N layers each of which is made of a first fiber material and a second fiber material, where N is an integer and is greater than or equal to 2;
the housing comprising a first region, and a second region made of the second fiber material;
wherein, a first layer of the N layers has a first fiber direction and comprises the first fiber material and the second fiber material, and a fiber direction of the first fiber material in the first layer is consistent with the first fiber direction, and a fiber direction of the second fiber material in the first layer is consistent with the first fiber direction, wherein a first splicing face where the first fiber material and the second fiber material in the first layer are spliced is hidden in the first layer so that when the first layer is formed as an outer surface of the housing, the housing is formed into one piece, and wherein, a second layer of the N layers has a second fiber direction and comprises the first fiber material and the second fiber material, and a fiber direction of the first fiber material in the second layer is consistent with the second fiber direction, and a fiber direction of the second fiber material in the second layer is consistent with the second fiber direction; wherein a second splicing face where the first fiber material and the second fiber material in the second layer are spliced is perpendicular to the second fiber direction perpendicular to the first fiber direction; and
an antenna securely disposed in the housing and comprising a radiator in the second region, wherein a shielding influence value of the second fiber material on the radiator is less than a shielding influence value of the first fiber material on the radiator.

2. The electronic device according to claim 1, wherein, a third layer of the N layers has the first fiber direction and comprises the first fiber material and the second fiber material, and a fiber direction of the first fiber material in the third layer is consistent with the first fiber direction, and a fiber direction of the second fiber material in the third layer is consistent with the first fiber direction; wherein a third splicing face where the first fiber material and the second fiber material in the third layer are spliced is parallel to the first fiber direction; wherein the first splicing face belongs to a first part of a dividing face, the dividing face being where the first region and the second region of the housing are divided, and the third splicing face belongs to a second part of the dividing face.

3. The electronic device according to claim wherein 1, a fourth layer of the N layers has the second fiber direction and comprises the first fiber material and the second fiber material, and a fiber direction of the first fiber material in the fourth layer is consistent with the second fiber direction in the fourth layer, and a fiber direction of the second fiber material is consistent with the second fiber direction; wherein a fourth splicing face where the first fiber material and the second fiber material in the fourth layer are spliced is perpendicular to the second fiber direction, and a first distance from the second splicing face to the dividing face is different from a second distance from the fourth splicing face to the dividing face.

4. The electronic device according to claim 3, wherein the second splicing face and the fourth splicing face are located at the same side of the dividing face.

5. The electronic device according to claim 1, wherein the first fiber direction form an angle of zero degree relative to a length direction or a width direction of the electronic device.

6. The electronic device according to claim 1, wherein the first fiber material comprises carbon fiber prepreg, aramid fiber prepreg, basalt fiber prepreg or glass fiber prepreg, and the second fiber material comprises aramid fiber prepreg, basalt fiber prepreg or glass fiber prepreg.

7. A method of manufacturing a housing for an electronic device, the method comprising the steps of:
laminating N layers of fiber material, each of which is made of a first fiber material and a second fiber material, where N is an integer and is greater than or equal to 2; wherein, a first layer of the N layers has a first fiber direction and comprises the first fiber material and the second fiber material, and a fiber direction of the first fiber material in the first layer is consistent with the first fiber direction, and a fiber direction of the second fiber material in the first layer is consistent with the first fiber direction, wherein a first splicing face where the first fiber material and the second fiber material in the first layer are spliced is hidden in the first layer so that when the first layer is formed as an outer surface of the housing, the housing is formed into one piece, wherein the step of laminating the N layers of fiber material further comprises laminating a second layer onto the first layer, wherein the second layer has a second fiber direction and comprises the first fiber material and the second fiber material, and a fiber direction of the first fiber material in the second layer is consistent with the second fiber direction, and a fiber direction of the second fiber material in the second layer is consistent with the second fiber direction; wherein a second splicing face where the first fiber material and the second fiber material in the second layer are spliced is perpendicular to the second fiber direction perpendicular to the first fiber direction; and
placing the laminated N layers of fiber material into a mold and thermally pressing and solidifying the laminated N layers of fiber material therein, so as to obtain the housing for the electronic device, the housing comprising a first region, and a second region made of the second fiber material, wherein a shielding influence value of the second fiber material on a radiator of an antenna is less than a shielding influence value of the first fiber material on the radiator.

8. The method according to claim 7, wherein the step of laminating the N layers of fiber material further comprises:
laminating a third layer onto the second layer, wherein the third layer has the first fiber direction and comprises the first fiber material and the second fiber material, and a fiber direction of the first fiber material in the third layer is consistent with the first fiber direction, and a fiber direction of the second fiber material in the third layer is consistent with the first fiber direction; wherein a third splicing face where the first fiber material and the second fiber material in the third layer are spliced is parallel to the first fiber direction; wherein the first splicing face belongs to a first part of a dividing face, the dividing face being where the first region and the second region of the housing are divided, and the third splicing face belongs to a second part of the dividing face.

9. The method according to claim 8, wherein the step of laminating the N layers of fiber material further comprises:

laminating a fourth layer onto the third layer; wherein the fourth layer has the second fiber direction and comprises the first fiber material and the second fiber material, and a fiber direction of the first fiber material in the fourth layer is consistent with the second fiber direction in the fourth layer, and a fiber direction of the second fiber material is consistent with the second fiber direction; wherein a fourth splicing face where the first fiber material and the second fiber material in the fourth layer are spliced is perpendicular to the second fiber direction, and a first distance from the second splicing face to the dividing face is different from a second distance from the fourth splicing face to the dividing face.

10. The method according to claim 9, wherein the second splicing face and the fourth splicing face are located at the same side of the dividing face.

11. The method according to claim 7, wherein the first fiber direction forms an angle of zero degree relative to a length direction or a width direction of the electronic device.

12. The method according to claim 7, wherein the first fiber material comprises carbon fiber prepreg, aramid fiber prepreg, basalt fiber prepreg or glass fiber prepreg, and the second fiber material comprises aramid fiber prepreg, basalt fiber prepreg or glass fiber prepreg.

* * * * *